United States Patent [19]

Saunders et al.

[11] 4,307,775
[45] Dec. 29, 1981

[54] CURRENT MONITORING CONTROL FOR ELECTRICALLY POWERED DEVICES

[75] Inventors: James F. Saunders, Onalaska; Robert E. Krocker, Stoddard, both of Wis.

[73] Assignee: The Trane Company, La Crosse, Wis.

[21] Appl. No.: 95,757

[22] Filed: Nov. 19, 1979

[51] Int. Cl.³ .............................. F28F 27/00
[52] U.S. Cl. .............................. 165/11 R; 165/12; 165/29; 62/127; 361/31
[58] Field of Search .............. 165/11, 12, 27, 29; 62/127, 181, 228 R; 361/22, 23, 31; 340/664

[56] References Cited

U.S. PATENT DOCUMENTS

| | | | |
|---|---|---|---|
| 3,742,302 | 6/1973 | Neill | 361/22 |
| 3,742,303 | 6/1973 | Dageford | 317/13 A |
| 3,959,704 | 5/1976 | McCrea | 318/387 |
| 3,962,694 | 6/1976 | Calia et al. | 340/664 X |
| 4,038,061 | 7/1977 | Anderson et al. | 62/126 |
| 4,041,451 | 8/1977 | Zarkades | 340/664 X |
| 4,084,406 | 4/1978 | Brenneman | 361/22 X |
| 4,104,888 | 8/1978 | Reedy et al. | 62/80 |

FOREIGN PATENT DOCUMENTS

314047 6/1972 U.S.S.R. ............................ 62/228

OTHER PUBLICATIONS

Essex Group, Type 296, Current Sensing Control data sheet.

*Primary Examiner*—Albert W. Davis
*Assistant Examiner*—Margaret A. Focarino
*Attorney, Agent, or Firm*—Carl M. Lewis; Ronald M. Anderson; Peter D. Ferguson

[57] ABSTRACT

Apparatus and method for controlling one or more electrically powered devices. A control for a temperature conditioning system is shown which is operative to monitor the electrical current supplied to component devices, i.e., compressors, auxiliary heating elements, indoor fan, and outdoor fan; and to cause an indicator means to indicate that one or more of the devices has failed to operate in a manner consistent with the controlled status of the system. If a failure is detected, control means are operative to lock out one or more of the devices from operation.

31 Claims, 7 Drawing Figures

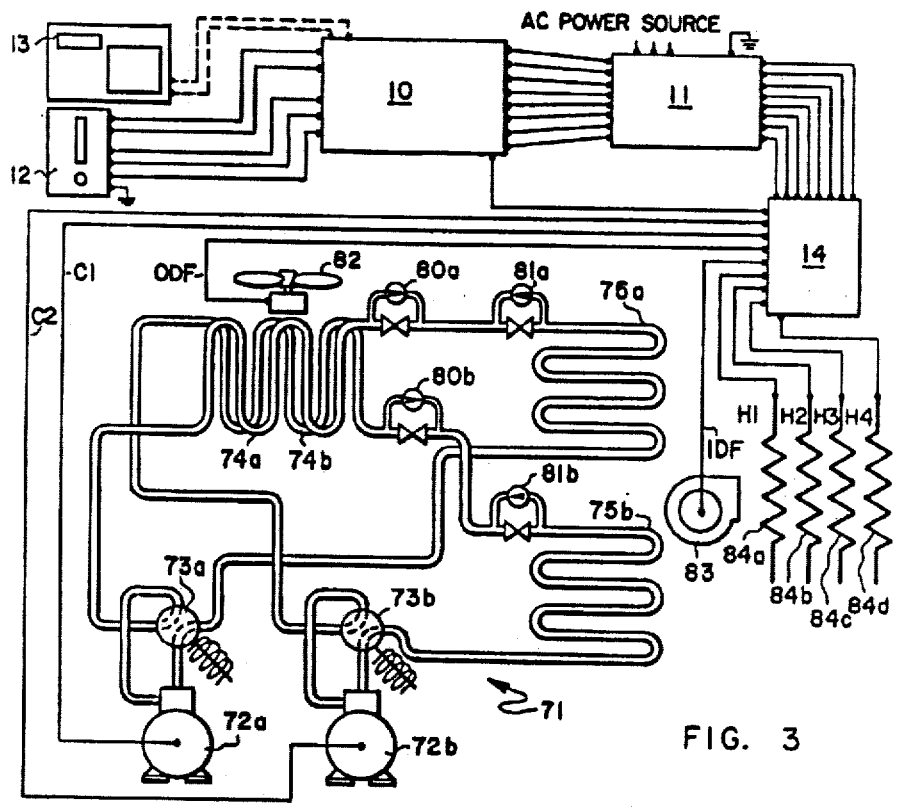
FIG. 3
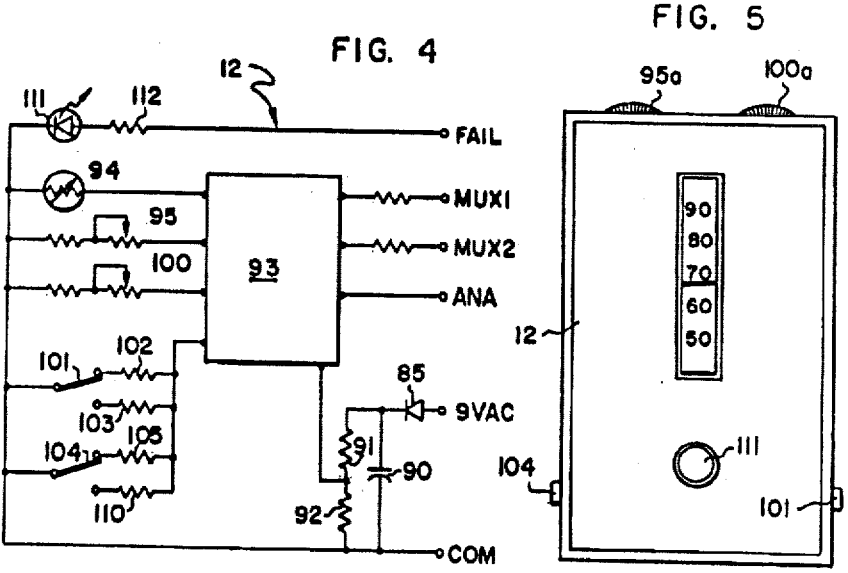
FIG. 4
FIG. 5

CURRENT MONITORING CONTROL FOR ELECTRICALLY POWERED DEVICES

DESCRIPTION

1. Technical Field

This invention in general pertains to an apparatus and method for controlling electrically powered devices to detect and indicate a failure of one or more of the devices by monitoring the supply current, and in particular to apparatus and method for controlling electrically powered devices comprising a temperature conditioning system, with respect to the aforesaid functions.

2. Background Art

A conventional temperature conditioning system may include a variety of electrically powered devices, such as compressors, fans, and heating elements, which must function together in a defined manner to maintain the temperature in a conditioned zone at a setpoint. Such devices are normally responsive to a system controller, which is operative to energize and de-energize the devices to meet the temperature conditioning demand. Clearly, failure of one or more of these devices to respond to the system controller may impair the operation of the entire system.

In terms of response to the system controller, a component device may fail in four distinct modes:

(1) failure to start when a system controller attempts to energize the device;

(2) failure to stop when a system controller attempts to de-energize the device;

(3) failure of the device during operation, after being energized by a system controller; or (4) failure, wherein the device starts to operate without a system controller energizing it.

Except for a possible tripped circuit breaker, there would typically be no indication of failure readily apparent to an operator or occupant of the conditioned space, until loss of a device was manifested in the failure of the system to function properly. Nor would there typically be means provided to protect the remaining components from the effects resulting from loss of a failed device.

In illustration, if a short circuit should cause an indoor fan motor circuit breaker to trip while a heat pump were operating in the cooling mode, the operator would probably be unaware of the failure until noticing an increase in the temperature of the conditioned space. Furthermore, failure of the indoor fan would substantially reduce the evaporation of liquid refrigerant in the indoor heat exchanger, possibly damaging a compressor, due to slugging. Or, if a compressor failed while a heat pump were operating in the heating mode, e.g., due to a defective contactor, the circuit breaker would not trip to indicate a failure, and the system might continue to provide comfort heat using only the auxiliary electric heating elements. In this case, an operator would possibly remain unaware of the compressor failure until receiving an abnormally high utility bill, resulting from the exclusive use of less efficient electric resistance heating.

Recognizing that there is at least a need to alert an operator of a failed compressor, the Canadian Standards Association now requires that air conditioners sold in Canada provide an indication of compressor failure at an indoor thermostat location. Various methods are available to detect this particular condition, and thereby to effect an indication of its occurrence, including sensing the temperature of a conditioned air stream; sensing refrigerant temperature, pressure, or flow; or sensing the presence of compressor supply current. In fact, the latter approach will probably be used by a number of air conditioning manufacturers, since a current sensing control is commercially available for implementing it.

However, it should be noted that this conventional control does not respond to the magnitude of the supply current, but rather to its presence or absence. It would therefore not be practical for use in detecting the failure of one of several devices, since a separate such control with current sensor would be required for monitoring each device of interest. The complexity and cost of integrating several current sensing controls of the prior art design into a system control capable of detecting the four possible failure modes for each device would be excessive. In addition, the prior art current sensing control does not include circuitry to de-energize other devices which depend on the operation of a failed device for the continued functioning of the system.

It is therefore an object of this invention to provide method and apparatus for detecting the failure of one or more electrically powered devices of a system by sensing the magnitude of the electrical supply current to determine if it is inconsistent with the controlled status of the system.

Another object of this invention is to indicate the failure of one or more of the devices with an indicator means.

A further object of this invention is to lock out of operation one or more devices, upon detecting the failure of one or more devices.

A still further object of this invention is to de-energize devices which are dependent on the continued operation of the failed one or more devices.

These and other objects of the present invention will become apparent from the drawings and the description of the preferred embodiments which follow.

SUMMARY OF THE INVENTION

In the present invention, apparatus for controlling one or more electrically powered devices includes a current sensing transducer for producing a signal indicative of the magnitude of the electrical supply current to the devices. Also included are indicator means for indicating that one or more of the devices has failed; and control means, connected to receive and monitor the signal produced by the current sensing transducer.

The control means are operable to energize and de-energize the one or more devices, thereby determining their controlled status, and are responsive to the magnitude of the supply current to the devices. Thus, the control means are operable to cause the indicator means to indicate that one or more of the devices has failed (1) if the magnitude of the supply current does not substantially change when the control means attempt to (a) energize or (b) de-energize one or more of the devices; (2) if the magnitude of the supply current decreases independently of the control means effecting a change in the controlled status of the one or more devices; or (3) if the magnitude of the supply current increases independently of the control means effecting a change in the controlled status of the one or more devices. The control means are further operative to lock out of operation one or more of the devices if a failed device is detected by the occurrence of conditions (1a) or (2) described above.

A method for effecting the functions provided by the above described apparatus is a further aspect of this invention.

BRIEF DESCRIPTION OF THE DRAWINGS

FIG. 3 is a block diagram of a heat pump to which the present invention has application.

FIG. 4 is a schematic diagram of a first embodiment of the indicator means.

FIG. 5 is a plan view of the embodiment shown in FIG. 4.

DESCRIPTION OF THE PREFERRED EMBODIMENTS

Figure 1:
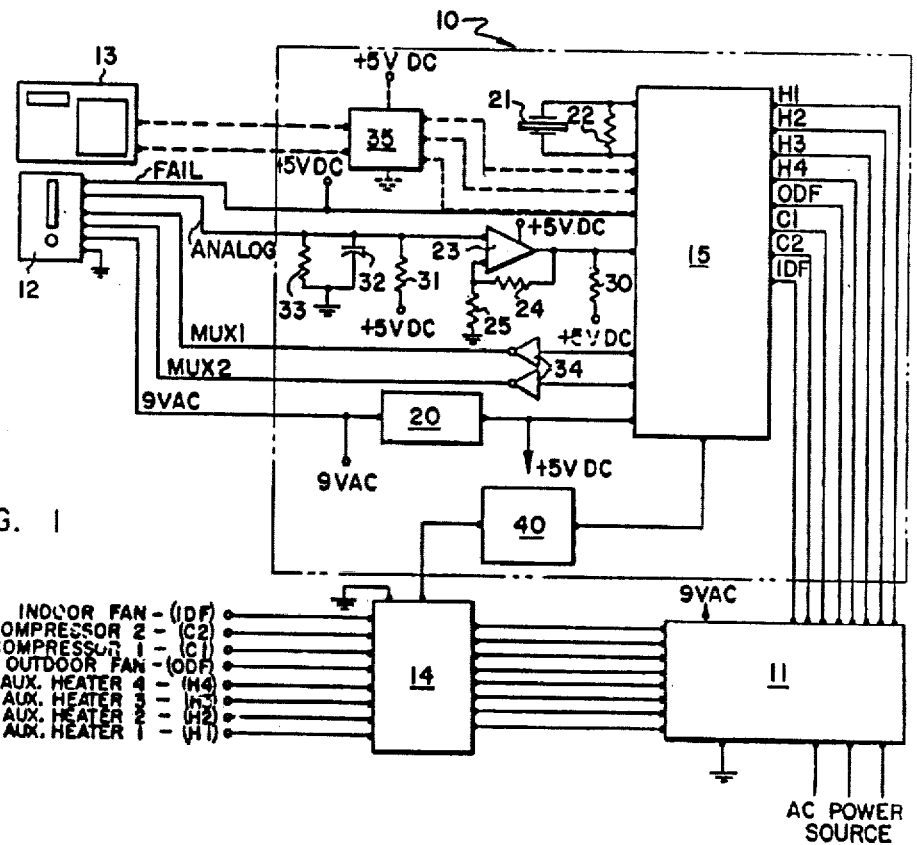
FIG. 1 is a schematic diagram of the preferred control circuitry for carrying out the present invention.

With reference to FIG. 1, control means comprising unit controller 10 (shown inside the alternating dot/-dashed lines) are adapted to effect the operation of external component devices through signals provided a relay driver panel 11. In the application of the present invention to a heat pump, as shown for the preferred embodiment, the unit controller 10 is connected to receive and transmit signals to indicator means comprising thermostat 12, or in the alternative thermostat 13. Thermostat 12 is less complex and lower in cost than thermostat 13; however, thermostat 13 is capable of carrying out additional functions which are not claimed in the present application.

The unit controller 10 is responsive to signals from thermostat 12 or thermostat 13, and in addition, to a signal provided by current transformer 14 connected to monitor supply current to the component devices. These component devices include first and second compressor stages ($C_1$ and $C_2$), the indoor fan (IDF), the outdoor fan (ODF), and four stages of auxiliary electric heat, ($H_1$–$H_4$). The heart of the unit controller 10 is microcomputer 15, which in the preferred embodiment, is an Intel Corporation large scale integrated circuit microcomputer, type 8022. The type 8022 is preferred specifically because, in addition to a central processing unit (CPU), read-only memory (ROM), and random access memory (RAM), it includes a two channel analog-to-digital (A-D) converter. Stored in the permanent read-only memory of the microcomputer 15 are specific machine code instructions comprising a program which enables the unit controller 10 to carry out its design functions. Most of the program is involved with maintaining a comfort temperature in a conditioned zone wherein thermostat 12 or thermostat 13 are disposed, and do not involve functions directed to the present invention. To simplify this explanation, only the control logic involving the functions of the present invention will be discussed below.

Microcomputer 15 is powered by a generally conventional DC power supply 20, which supplies a regulated 5 volts DC. Relay driver panel 11, comprising triacs, relays and contactors as will be further discussed below, also includes a step down transformer to supply 9 volts AC as an input to the DC power supply 20 and thermostat 12. A quartz crystal 21 and resistor 22 are connected in parallel to microcomputer 15 to provide a constant frequency time base.

Six conductors connect the unit controller 10 with thermostat 12. Two of these conductors MUX1 and MUX2 are connected to microcomputer 15 via invertors 34, and enable it to select a source of analog signal to be transmitted by thermostat 12, as will be explained below. This signal is transmitted to the unit controller 10 on an "ANALOG" signal line connected to the input of an operational amplifier 23, whose output in turn is connected to the microcomputer 15. Operational amplifier 23 amples the analog signal supplied by the thermostat 12 in non-inverting mode, with a gain established by the resistance of input and feedback resistors 24, 25, and 31. Resistor 33 and capacitor 32, connected in parallel between the input to operational amplifier 23 and ground, filter out any noise picked up by the "ANALOG" signal conductor. Another of the six conductors, labeled, "FALL" provides means for the unit controller 10 to cause the thermostat 12 to indicate that one or more of the devices has failed, as also explained below.

If the alternative thermostat 13 is used, only a two-conductor lead is required to connect it to the unit controller 10. Thermostat 13 is a "smart" terminal, itself including a microcomputer to provide additional control capability, and also including expanded display means, and a keyboard. A parallel to serial communications chip 35 (in the preferred embodiment a type SN75119) is included in the unit controller 10 to enable thermostat 13 to carry on two-way (half-duplex) serial communication with microcomputer 15. The technique by which this communication is effected is well-known to one skilled in the art and will not be further discussed.

Unit controller 10 is able to monitor the supply current by its connection to the analog signal provided by current transformer 14. This signal is converted from alternating current to direct current and filtered by combination rectifier and filter means 40 of generally conventional design, and input to the microcomputer 15.

Figure 2:
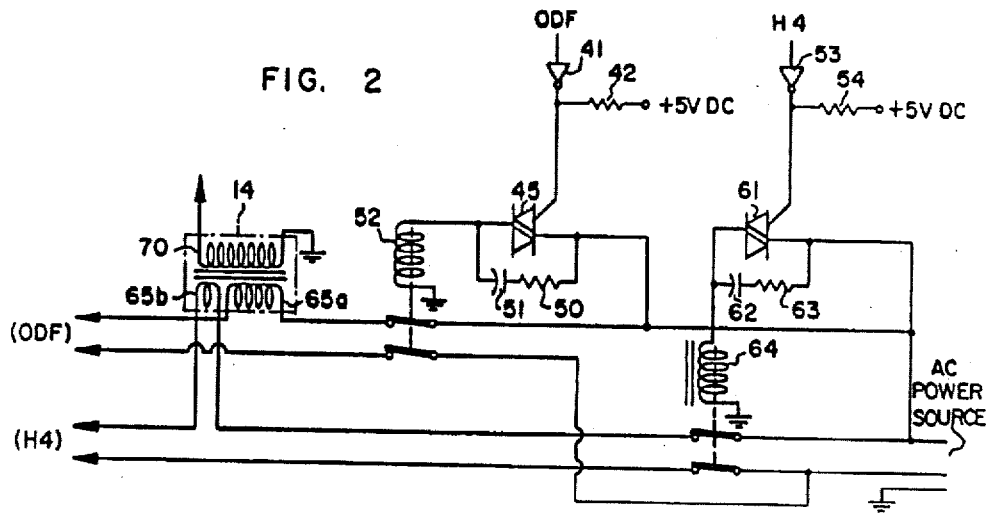
FIG. 2 shows a schematic diagram for typical relay drivers and typical configurations of the curent sensing means of the present invention.

Turning now to FIG. 2, details for two of the eight relay driver circuits on the relay driver panel are shown which are typical of the other relay driver circuits. Microcomputer 15 is operative to energize and de-energize the devices through control lines connected to the relay driver panel. FIG. 2 shows two of the eight control lines, the first for the outdoor fan denoted ODF, and the second for the fourth stage of electrical heating denoted $H_4$. The output signal from microcomputer 15 on control line ODF is inverted by logic inverter 41, followed by pull-up resistor 42, and is then connected to the gate of triac 45. Resistor 50 and capacitor 51 are connected in series around the triac 45 as a snubbing circuit to filter out noise. Triac 45 is operative to conductor current to energize the coil of relay 52, causing its contacts to close, thereby energizing the outdoor fan motor (not shown in FIG. 2).

In a similar fashion control line $H_4$, with the related inverter 53, pull-up resistor 54, triac 61, and filter comprising capacitor 62 and resistor 63 are connected to energize contactor 64, thereby energizing the fourth stage of electric heat (also not shown in FIG. 2). Similar circuitry is provided on the relay driver panel 11 so that the remaining control lines are operative to energize the other component devices. Supply current for each of these devices passes through a separate primary winding 65 in current transformer 14. A device which consumes relatively less current, such as the outdoor fan, is provided with relatively more turns of conductor 65a on the core of current transformer 14, then a device such as the fourth stage of electric heat which consumes relatively more current. This insures that each device will have a substantial effect on the magnitude of current produced in the secondary winding 70 of current transformer 14. It should be apparent that although only two primary windings 65a and 65b are shown in FIG. 2, additional primary windings, one each for the remaining devices whose current is monitored by the current transformer 14 are also included in the primary windings 65 of current transformer 14.

Turning now to FIG. 3, application of the present invention to specific electrically powered temperature conditioning apparatus is shown. The temperature conditioning system 71 includes a generally conventional dual circuit heat pump of the vapor compression type, each circuit having a compressor 72, reversing valve 73, outdoor heating exchange coil 74, indoor heat exchange coil 75, and expansion/bypass valves 80 and 81. The system 71 further includes outdoor fan 82, indoor fan 83, and four auxiliary electric heating stages 84.

As is well known to those skilled in the art, compressors 72 are operative to compress a vaporized refrigerant which passes through reversing valve 73 and through the indoor heat exchange coil 75 in heat exchange relationship with air circulated into the temperature conditioned zone by the indoor fan 83. The indoor heat exchanger 75 operates to condense the compressed vaporized refrigerant, thereby heating the air which is circulated therethrough and into the comfort zone. The resulting condensed refrigerant bypasses through expansion/bypass valve 81, and expands through expansion/bypass valve 80, into outdoor heat exchanger 74, vaporizing and absorbing heat from the outdoor ambient air. The vaporized refrigerant thereafter returns through reversing valve 73 to compressor 72.

The efficiency of such temperature conditioning apparatus in heating a temperature conditioned zone declines significantly when the outside ambient temperature is reduced. Under these conditions, the auxiliary electric heat stages 84 are energized as required to meet the temperature conditioning demand.

Cooling of the temperature conditioned zone is provided by causing the reversing valves 73 to operate thereby interchanging the connection and functions of the outdoor and indoor heat exchanger coils 74 and 75, respectively. In the cooling mode, the outdoor heat exchanger coils 74 serve as a condensing unit, and the indoor heat exchange coils 75, as evaporator units.

As FIG. 3 shows each of the electrically powered devices comprising the temperature conditioning system 71 may be selectively energized or de-energized through operation of the relay driver panel 11, under the control of the unit controller 10. The electrical supply current to each of these loads is in turn sensed by current transformer 14, and monitored by the microcomputer 15. The manner in which unit controller 10 maintains temperature in a comfort zone at a predetermined level is not the subject of this invention and will not be further discussed; however, it should be apparent that through its connection to temperature sensing thermostat 12 or alternatively, thermostat 13, the unit controller 10 may respond to the temperature in the conditioned zone.

Control lines and electric supply current leads for reversing valves 73 are not shown in FIG. 3. Although the supply current for reversing valves 73 could also be monitored in the same manner as the other devices, in the preferred embodiment, it is not.

In FIGS. 4 and 5 respectively the generally schematic diagram and external plan view of the thermostat 12 are shown. Power is supplied to thermostat 12 as 9 volts AC, being half-wave rectified by diode 85 and filtered by capacitor 90. Resistors 91 and 92 form a voltage divider circuit to reduce the level of the resulting DC voltage to approximately 5 volts. An analog signal multiplexor 93, transmits an analog signal selected by the microcomputer 15, on the "ANALOG" signal line. The analog signal is a DC voltage representative of either the temperature in the comfort zone as sensed by the thermistor 94; the cooling setpoint as sensed by variable resistor 95; the heating setpoint sensed by variable resistor 100; or the position of switches 101 and 104, which depends on the values of resistors 102 and 103, and 105 and 110, respectively. Switch 101 is provided to select between system "ON" and system "OFF", and switch 104 is provided to select between "FAN ON" (continually), and "AUTO FAN". The position of switches 101 and 104 determine the voltage drop on the conductor which is common to resistors 102, 103, 105, and 110, thereby providing an analog signal indicative of the various combinations of the switch positions. The multiplexor selected for use in the preferred embodiment is a Motorola Company type MC14051, however similar multiplexors are equally applicable.

Thermostat 12 also includes a light-emitting diode (LED) 111, in series with a current limiting resistor 112. Under the control of the microcomputer 15, via the conductor denoted "FAIL", LED 111 is caused to flash at a perceptible rate to indicate a partial failure mode, or to be continually lighted to indicate a total failure of the temperature conditioning apparatus 71. As is shown in FIG. 5, LED 111 is conspicuously mounted on the front panel of thermostat 12, where it is readily observable by an operator in the temperature conditioned zone. It should therefore be evident that an operator would be readily alerted by the lighted or flashing LED 111, of a condition in which one or more of the devices comprising the temperature conditioning apparatus 71 has failed, and whether the failed device caused a partial or total system failure.

Figure 6:
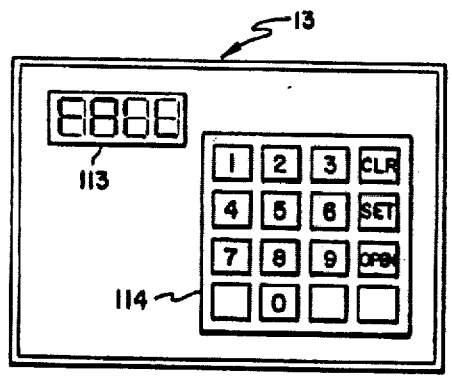
FIG. 6 is a plan view of a second embodiment of the indicator means.

An alternative embodiment of the indicator means is shown in a plan view of thermostat 13, reference FIG. 5. Thermostat 13 includes a four-digit, five-by-seven segment LED display 113, and a keyboard 114 which may be used by an operator to communicate with the unit controller 10. Not shown in FIG. 6 are temperature sensing means, comprising a thermistor which is included either within or external to thermostat 13, for sensing the temperature in the conditioned zone. Relative to the present invention, thermostat 13 includes the capacity to indicate the failure of one or more of the devices by either flashing the word "FAIL" on the display 113, indicating partial failure of the temperature conditioning apparatus 71, or to continuously display the word "FAIL" to indicate a total failure of the temperature conditioning apparatus 71. In addition, since thermostat 13 includes a keyboard 114 for communication with the unit controller 10, an operator may interrogate microcomputer 15 to determine which of the devices whose supply current is sensed by current transformer 14 have failed. The unit controller 10 communicates with thermostat 13 over a two-wire digital serial communication line, and can present an alphanumeric code representative of the failed one or more devices, in display 113.

It is anticipated that unit controller 10 might also be connected to an energy management system of considerably greater complexity than thermostat 13, using the same two-wire serial communication lines shown connected to thermostat 13. The energy management system could thereby interrogate the microcomputer 15 in the same manner to determine which one or more devices of the temperature conditioning apparatus 71 had failed.

Stored in the read-only memory (ROM) of microcomputer 15 is the program which enables it to implement both the functions of the present invention and control of the temperature conditioning apparatus 71 to meet the temperature conditioning demand in the conditioned zone. The program necessary to carry out the present invention constitutes a subroutine relative to the main line program which maintains the comfort zone temperature.

Figure 7:
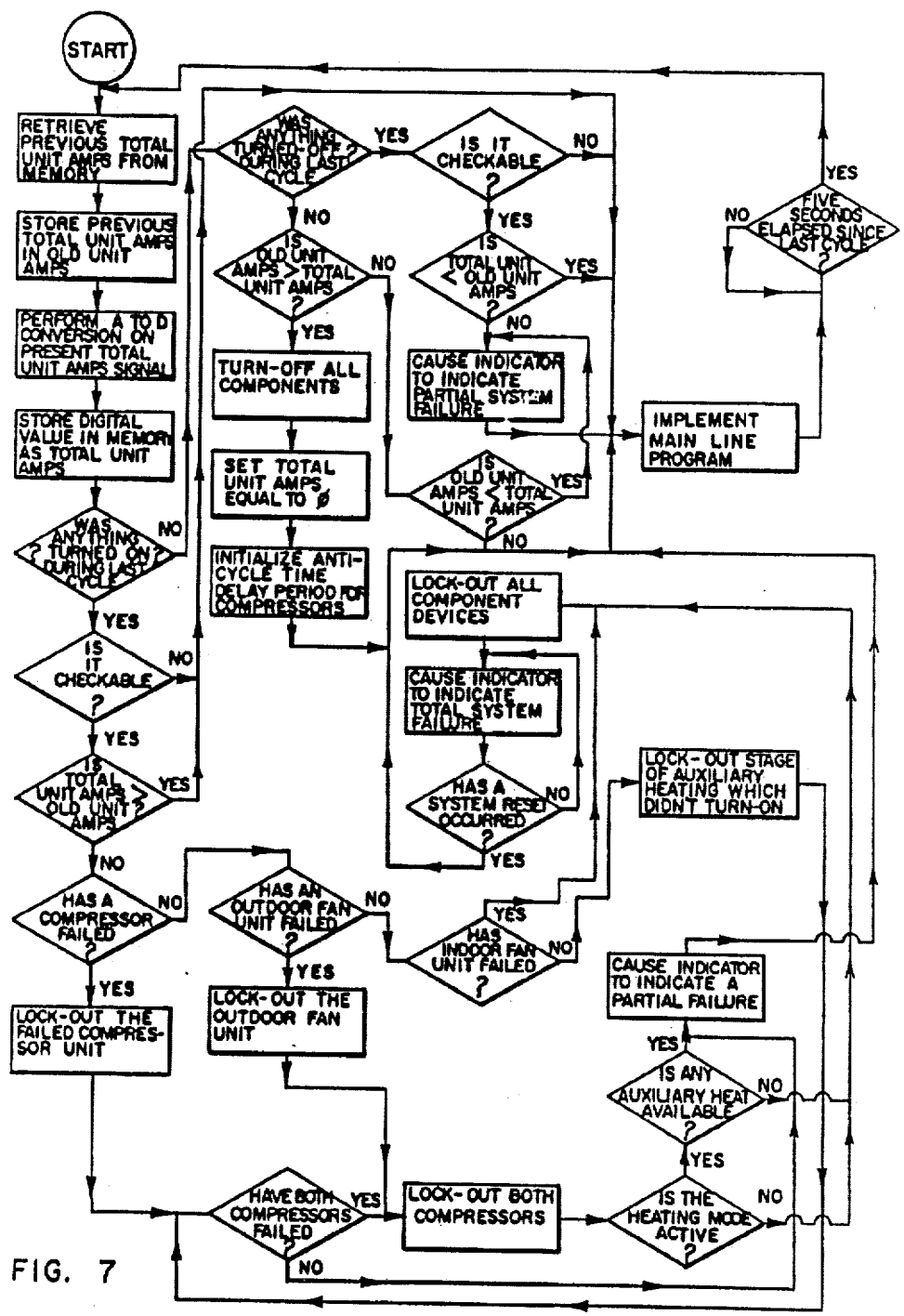
FIG. 7 is a flow chart illustrating the control logic for implementing the present invention.

Logic defined by the subroutine program stored in the ROM of microcomputer 15 is illustrated in the flow chart shown in FIG. 7. With reference to that flow chart, it should be pointed out that during normal operation of the system components, i.e., operation without a failure, the microcomputer 15 will be primarily occupied in implementing the main line program or in waiting, and will cycle to the start of the current monitoring and failure detection subroutine, only at approximately 5 second intervals. Each time the microcomputer 15 enters this subroutine, from random access memory (RAM) it retrieves the digital value representing the magnitude of the supply current which was sensed by current transformer 15 during the last cycle through the subroutine. This value is denoted "Total Unit Amps" in the flow chart, and is temporarily stored in RAM as a value denoted "Old Unit Amps". Next, the microcomputer 15 performs an analog-to-digital conversion of the analog signal from the current transformer 14 to obtain a digital value representative of the relative magnitude of the present supply current. This digital value is stored in memory in the previous location of "Total Unit Amps", referenced above.

Two digital words in the RAM of microcomputer 15 represent the particular devices which were in an energized condition during the last cycle through the main line program; i.e., the system status. Those two words are referred to as the "Present Latch Bits". When the microcomputer 15 changes the system status by energizing or de-energizing a device, the two words representing the previously energized devices or prior system status, are temporarily stored in memory, and are referred to as the "Old Latch Bits". Also stored in the computer memory are two digital words representing the devices which were originally installed and available to be energized in the temperature conditioning system 71; these two words are referred to as the "Original Configuration Bits". The "Original Configuration Bits" provide the means by which the microcomputer 15 keeps track of which devices are available to be energized or de-energized in meeting the temperature conditioning demand. Should a device fail, the "Original Configuration Bits" are changed so that the devices which are thereafter available to meet the temperature conditioning demand are represented in two words referred to as the "Present Configuration Bits". Microcomputer 15 thereafter will only attempt to energize those devices represented as present and operable by the "Present Configuration Bits", until a reset occurs. Those skilled in the art will understand that a bit pattern defining a word in the computer memory may be illustrated as a series of zeroes and ones, wherein, for example a "one" may represent an available operable device, and a "zero" may represent an unavailable or failed device.

By comparing the words in memory for "Present Latch Bits" and "Old Latch Bits", the microcomputer 15 is able to determine if a device was energized or de-energized during the last cycle through the main line program, and if so, whether it is one of the devices whose supply current is being monitored to determine its failure. For example, supply current to the reversing valve is not monitored and it is therefore not a checkable device. Non-checkable devices are masked out of the latch bits comprising the words. Assuming that a checkable device was energized during the last cycle, the microcomputer 15 determines if the "Total Unit Amps" are greater than the "Old Unit Amps". It should be apparent that if a checkable device were energized, the supply current should increase in response thereto. If so, control reverts to the main line program. If not, the microcomputer 15 determines which of the monitored devices has failed by comparison of the "Present Latch Bits" and "Old Latch Bits", and the appropriate action to be taken in response thereto. If a compressor has failed, the failed compressor is locked out of operation. When a device is locked out of operation, the two words comprising the "Original Configuration Bits" are changed to the "Present Configuration Bits", wherein the failed device is no longer represented as being available for operation. Until reset, the failed device will appear to the microcomputer 15 as if it had never been installed, since it is not represented in the "Present Configuration Bits".

If both compressors 72 have failed, they are both locked out of operation, and an appropriate response is taken based upon whether the heating or cooling mode is presently active. If the system is in the heating mode, and if auxiliary heat is operational, the microcomputer 15 causes the indicator LED 111 to flash, or display 113 to flash "FAIL", thereby indicating a partial system failure. Otherwise, if electric heat is not available or if the system is in the cooling mode, all component devices are locked out of operation and microcomputer 15 causes the LED 111 or display 113 to indicate a total system failure by remaining constantly lighted. Thereafter, the system would await a reset before again implementing the main line program.

On the other hand, if an outdoor fan unit 82 failed initially, it would be locked out of operation along with both compressors 72. It should be apparent that failure of the outdoor fan unit 82 could cause the outdoor heat exchange coil 74 to freeze up in heating mode; or to fail to condense refrigerant in the cooling mode thereby possibly damaging compressors 72, unless both units are de-energized. In the heating mode, electric resistance heat would still be available, and the system 71 could continue to operate, while indicating the occurrence of a partial failure.

In an analogous logic, if the indoor fan unit failed, the temperature conditioning apparatus 71 would thereafter be ineffective to circulate temperature conditioned air; the microcomputer 15 would therefore lock out all component devices and cause the LED 111 or display 113 to indicate total system failure until a reset occurred.

Failure of a stage of auxiliary heat 84 would be detected in the same manner, and would result in the lock out of all component devices only if the temperature conditioning system 71 were in the heating mode and both compressors 72 and other stages of auxiliary electric heat 84 were unavailable. Otherwise, microcomputer 15 would cause the LED 111 to indicate partial failure, and merely lock out the failed stage of auxiliary electric heat 84.

Assuming that a checkable device was de-energized during the last cycle through main line program, but that the "Total Unit Amps" were not less than the "Old Unit Amps", as should be the case, microcomputer 15 will cause the LED 111 or display 113 to flash indicating a partial system failure and thereafter will implement the main line program. Under these conditions, a device apparently failed to turnoff and locking out the device will accomplish nothing.

If a checkable device was neither energized nor de-energized during the last cycle, but the "Old Unit Amps" is greater than the "Total Unit Amps", indicating that the current decreased and therefore that a device failed during the last cycle, microcomputer 15 will (1) turn off all conponents; (2) set the "Total Unit Amps" equal to zero; (3) initialize the anti-cycle time delay period to prevent rapid cycling of the compressors which might damage them; and (4) implement the main line program. The main line program will operate to energize the devices, as required to meet the temperature conditioning demand, entering the failure detection subroutine after each attempt to energize a device has been made. The failed device will be identified by its failure to cause an increase in the supply current when an attempt is made to energize it, and one or more devices will be locked-out of operation and LED 111 or display 113 will be caused to indicate either a partial or total system failure, as described above. In the alternative, the failed device may be identified by selectively energizing each device in sequence until a device fails to cause an increase in the supply current.

The fourth failure mode is identified in the circumstance where the microcomputer 15 has neither energized nor de-energized a device during the last cycle through the main line program yet the "Old Unit Amps" is less than the "Total Unit Amps". This implies that a device has turned-on without being energized by the microcomputer 15, thereby causing the supply current to increase. Under these conditions, microcomputer 15 will cause the indicator LED 111 or display 113 to flash, indicating a partial system failure, and will continue to implement the main line program. Since the failed device has become independently energized and is therefore not under the control of the microcomputer 15, little else can be done, but to alert the operator of the failure.

If the alternative thermostat 13 is installed instead of thermostat 12, a partial system failure is indicated by microcomputer 15 causing the four-digit, five-by-seven-segment LED display 113, to flash, wherein selected segments are lighted to read "FAIL". Total system failure is indicated by microcomputer 15 causing the segments to remain in an apparent steady state condition, while indicating "FAIL". A user may thereafter interrogate the microcomputer 15, using the keyboard 114 to determine which of the monitored devices have been locked-out. This is accomplished by microcomputer 15 through comparison of "Present Configuration Bits" with "Original Configuration Bits", which represent devices originally available. The locked-out one or more devices are represented by a number or letter code in the display. It should be apparent that the one or more locked-out devices will always include the one or more failed devices.

Although the present invention has been disclosed in a preferred embodiment utilizing a microcomputer, it is also possible that the invention could be carried out using hardware logic and discrete components, or by using a more sophisticated digital computer.

It should further be apparent to one skilled in the art that the present invention has application to any system of electrically powered devices which may be selectively energized or de-energized by a control means. It is not limited to a temperature conditioning system, although so disclosed in terms of a preferred embodiment.

Thus, while the invention has been described with respect to a preferred embodiment, it is to be understood that modifications thereto will become apparent to those skilled in the art, which modifications lie within the scope of the present invention, as defined in the claims which follow.

We claim:

1. Apparatus for controlling one or more electrically powered devices comprising
   a. a current sensing transducer for producing a signal proportional to the magnitude of electrical supply current to said devices;
   b. indicator means for indicating that one or more of said devices has failed;
   c. control means for energizing and de-energizing the one or more devices, thereby determining their controlled status, connected to receive and monitor the signal produced by the current sensing transducer, and including means for comparing the magnitude of successively monitored values of the signal, thereby responding to relative changes in the magnitude of said supply current, such that the control means are operative to cause the indicator means to indicate that one or more of the devices has failed, if one of the following conditions occurs:
      i. the magnitude of the signal proportional to the supply current does not substantially increase over the preceding value monitored by the control means when said control means attempt to energize one or more of the devices;
      ii. the magnitude of the signal proportional to the supply current does not substantially decrease from the preceding value monitored by the control means when said control means attempt to de-energize one or more devices;
      iii. the magnitude of the signal proportional to the supply current decreases from the preceding value monitored by the control means independently of the control means effecting a change in the controlled status of said one or more devices; or
      iv. the magnitude of the signal proportional to the supply current increases over the preceding value monitored by the control means independently of the control means effecting a change in the controlled status of said one or more devices.

2. The apparatus of claim 1 wherein the control means are operative to lock-out one or more of the devices from operating if either said condition (i), or (iii) occurs.

3. Apparatus for controlling one or more electrically powered devices comprising
   a. a current sensing transducer for producing a signal proportional to the magnitude of electrical supply current to said devices;
   b. indicator means for indicating that one or more of said devices has failed;
   c. control means for energizing the one or more devices, thereby determining their controlled status, connected to receive and monitor the signal produced by the current sensing transducer, and including means for comparing the magnitude of successively monitored values of the signal, thereby responding to relative changes in the magnitude of said supply current, such that the control means are operative to cause the indicator means to indicate that one or more of the devices has failed, if the magnitude of the signal proportional to the supply current does not increase over the preceding value monitored by the control means when said control means attempt to energize one or more of the devices.

4. Apparatus for controlling one or more electrically powered devices comprising
   a. a current sensing transducer for producing a signal proportional to the magnitude of electrical supply current to said devices;
   b. indicator means for indicating that one or more of said devices has failed;
   c. control means for energizing and de-energizing the one or more devices, thereby determining their controlled status, connected to receive and monitor the signal produced by the current sensing transducer, and including means for comparing the magnitude of successively monitored values of the signal, thereby responding to the relative changes in the magnitude of said supply current, such that the control means are operative to cause the indicator means to indicate that one or more of the devices has failed, if the magnitude of the signal proportional to the supply current does not decrease from the preceding value monitored by the control means when said control means attempt to de-energize one or more of the devices.

5. Apparatus for controlling one or more electrically powered devices comprising
   a. a current sensing transducer for producing a signal proportional to the magnitude of electrical supply current to said devices;
   b. indicator means for indicating that one or more of said devices has failed;
   c. control means for energizing and de-energizing the one or more devices, thereby determining their controlled status, connected to receive and monitor the signal produced by the current sensing transducer, and including means for comparing the magnitude of successively monitored values of the signal, thereby responding to relative changes in the magnitude of said supply current, such that the control means are operative to cause the indicator means to indicate that one or more of the devices has failed, if the magnitude of the signal proportional to the supply current decreases from the preceding value monitored by the control means independently of the control means effecting a change in the controlled status of said one or more devices.

6. Apparatus for controlling one or more electrically powered devices comprising
   a. a current sensing transducer for producing a signal proportional to the magnitude of electrical supply current to said devices;
   b. indicator means for indicating that one or more of said devices has failed;
   c. control means for energizing and de-energizing the one or more devices, thereby determining their controlled status, connected to receive and monitor the signal produced by the current sensing transducer, and including means for comparing the magnitude of successively monitored values of the signal, thereby responding to relative changes in the magnitude of said supply current, such that the control means are operative to cause the indicator means to indicate that one or more of the devices has failed, if the magnitude of the signal proportional to the supply current increases over the preceding value monitored by the control means independently of the control means effecting a change in the controlled status of said one or more devices.

7. The apparatus of claims 1, 3, 5, or 6 wherein said devices comprise a temperature conditioning system, including one or more refrigerant vapor compressors, an indoor heat exchanger, an outdoor heat exchanger, one or more indoor fans, and one or more outdoor fans, connected to cool a comfort zone.

8. The apparatus of claim 7 wherein said temperature conditioning system comprises a heat pump, and further, includes one or more stages of electrical heating elements; said heat pump being operative to selectively heat or cool the comfort zone.

9. The apparatus of claim 8 wherein the current sensing transducer is a current transformer.

10. The apparatus of claim 9 wherein said current transformer is wound with relatively more turns of conductor carrying supply current to specific ones of the devices rated to operate with relatively less supply current, than with turns of conductor carrying supply current to others of the devices rated to operate with relatively more supply current, such that all the devices each contribute significantly to the magnitude of the signal produced by the current transformer.

11. The apparatus of claim 10 wherein said control means include an analog-to-digital convertor for conversion of the signal received from the current transformer into digital format.

12. A method for controlling one or more electrically powered devices comprising the steps of
   a. sensing the magnitude of electrical supply current to said devices and producing a signal proportional to said magnitude;
   b. receiving and monitoring the signal proportional to the magnitude of said supply current;
   c. comparing the magnitude of successively monitored values of the signal, thereby responding to relative changes in the magnitude of the current;
   d. energizing and de-energizing the one or more devices, thereby determining their controlled status; and
   e. effecting an indication of failure of one or more of the devices if one of the following conditions should occur:
      i. the magnitude of the signal proportional to the supply current does not substantially increase over the immediately preceding monitored value when an attempt is made to energize one or more of the devices;

ii. the magnitude of the signal proportional to the supply current does not substantially decrease from the immediately preceding monitored value when an attempt is made to de-energize one or more of the devices;

iii. the magnitude of the signal proportional to the supply current decreases from the immediately preceding monitored value independently of a controlled change in the controlled status of said one or more devices; or iv. the magnitude of the signal proportional to the supply current increases over the immediately preceding monitored value independently of a controlled change in the controlled status of said one or more devices.

13. The method of claim 12 further comprising the step of locking-out of operation one or more of the devices, if either said condition (i) or (iii) occurs.

14. A method for controlling one or more electrically powered devices comprising the steps of
 a. sensing the magnitude of electrical supply current to said devices and producing a signal proportional to said magnitude;
 b. receiving and monitoring the signal proportional to the magnitude of said supply current;
 c. comparing the magnitude of successively monitored values of the signal, thereby responding to relative changes in the magnitude of the current;
 d. energizing and de-energizing the one or more devices, thereby determining their controlled status; and
 e. effecting an indication of failure of one or more of the devices if the magnitude of the signal proportional to the supply current does not substantially decrease from the immediately preceding monitored value when an attempt is made to de-energize one or more of the devices.

15. A method for controlling one or more electrically powered devices comprising the steps of
 a. sensing the magnitude of electrical supply current to said devices and producing a signal proportional to said magnitude;
 b. receiving and monitoring the signal proportional to the magnitude of said supply current;
 c. comparing the magnitude of successively monitored values of the signal, thereby responding to relative changes in the magnitude of the current;
 d. energizing and de-energizing the one or more devices, thereby determining their controlled status; and
 e. effecting an indication of failure of one or more of the devices if the magnitude of the signal proportional to the supply current does not substantially decrease from the immediately preceding monitored value when an attempt is made to de-energize one or more of the devices.

16. A method for controlling one or more electrically powered devices comprising the steps of
 a. sensing the magnitude of electrical supply current to said devices and producing a signal proportional to said magnitude;
 b. receiving and monitoring the signal proportional to the magnitude of said supply current;
 c. comparing the magnitude of successively monitored values of the signal, thereby responding to relative changes in the magnitude of the current;
 d. energizing and de-energizing the one or more devices, thereby determining their controlled status; and
 e. effecting an indication of failure of one or more of the devices if the magnitude of the signal proportional to the supply current decreases from the immediately preceding monitored value independently of a controlled change in the controlled status of said one or more devices.

17. A method for controlling one or more electrically powered devices comprising the steps of
 a. sensing the magnitude of electrical supply current to said devices and producing a signal proportional to said magnitude;
 b. receiving and monitoring the signal proportional to the magnitude of said supply current;
 c. comparing the magnitude of successively monitored values of the signal, thereby responding to relative changes in the magnitude of the current;
 d. energizing and de-energizing the one or more devices, thereby determining their controlled status; and
 e. effecting an indication of failure of one or more of the devices if the magnitude of the signal proportional to the supply current increases over the immediately preceding monitored value independently of a controlled change in the controlled status of said one or more devices.

18. Apparatus for controlling a temperature conditioning system including a plurality of electrically powered devices, said apparatus comprising
 a. a current transformer having:
   a primary winding connected in series between one or more of the devices and a source of electrical power supply, and
   a secondary winding which produces an electrical signal that is proportional in magnitude to that of the total supply current flowing to said one or more devices;
 b. indicator means for indicating that one or more of the devices having current supplied through the primary winding on the current transformer has failed;
 c. switching means for connecting and disconnecting each of the devices to and from the source of electrical power supply in response to a control signal;
 d. control means connected to transmit the control signal to the switching means, for selectively energizing and de-energizing the one or more devices thereby determining their controlled status, and connected to receive and to periodically monitor the signal produced by the secondary winding of the current transformer, said control means including means for retaining the magnitude of the current transformer secondary signal previously monitored until after that signal is again periodically monitored; and means for comparing the magnitudes of the previously retained signal and the present signal indicative of the supply current, as it is successively monitored, whereby the control means are further operative to cause the indicator means to indicate that one or more of the devices has failed, if one or more of the following conditions occurs:
   i. the magnitude of the supply current does not substantially increase when said control means attempt to energize one or more of the devices;

ii. the magnitude of the supply current does not substantially decrease when said control means attempt to de-energize one or more of the devices;

iii. the magnitude of the supply current decreases independently of the control means transmitting a control signal to the switching means; or iv. the magnitude of the supply current increases independently of the control means transmitting a control signal to the switching means.

19. The apparatus of claim 18 wherein the control means are operative to lock-out one or more of the devices from operating if either said condition (i) or (iii) occurs.

20. A method for controlling a temperature conditioning system including a plurality of electrically powered devices, and a current transformer with a primary winding connected in series between one or more of the devices and a source of electrical power supply and a secondary winding which produces an electrical signal that is proportional in magnitude to that of the total supply current flowing to said one or more devices, comprising the steps of:

a. receiving and periodically monitoring the electrical signal produced by the current transformer secondary winding;

b. connecting and disconnecting each of the devices to and from the source of electrical power supply to selectively energize and de-energize the devices to meet a temperature conditioning demand, thereby determining their controlled status;

c. retaining the magnitude of the current transformer secondary winding signal previously monitored until after that signal is again periodically monitored;

d. comparing the magnitudes of the previously retained signal and the present signal indicative of the total supply current, as it is successively monitored; and e. effecting an indication of failure of one or more of the devices if one or more of the following conditions should occur:

i. the magnitude of the supply current does not substantially increase when said control means attempt to energize one or more of the devices;

ii. the magnitude of the supply current does not substantially decrease when said control means attempt to de-energize one or more of the devices;

iii. the magnitude of the supply current decreases independently of the control means effecting a change in the controlled status of said one or more devices; or iv. the magnitude of the supply current increases independently of the control means effecting a change in the controlled status of said one or more devices.

21. The apparatus of claims 1, 5, or 18 wherein if the magnitude of the signal proportional to the supply current decreases from the preceding value monitored by the control means without the control means effecting a change in the controlled status of the devices, said control means are further operative to de-energize substantially all of the devices, and thereafter to attempt to selectively energize the devices and to effect identification of the failed one or more of the devices when the magnitude of the supply current does not increase substantially in response thereto.

22. The apparatus of claim 21 wherein if the magnitude of the signal proportional to the supply current decreases from the preceding value monitored by the control means without the control means effecting a change in the controlled status of the devices, said control means, having identified the failed one or more of the devices, are further operative to lock-out of operation one or more of the devices.

23. The apparatus of claims 2, 3, 4, 5, 6 or 19 wherein the control means include timer means to delay a response to the magnitude of the signal proportional to the supply current for a predetermined time after the control means have attempted to energize or de-energize one or more of the devices, to allow time for settling.

24. The apparatus of claim 23 wherein said indicator means includes a visual display which is continuously in one of two alternative states to indicate normal operation of the devices; continuously in the other of the two alternative states to indicate a first failure mode; and alternatives between said two alternative states at a perceptively rapid rate to indicate a second failure mode.

25. The apparatus of claim 24 wherein one of the first and second failure modes includes the lock-out of substantially all of the devices, and the other of the first and second failure modes includes the lock-out of one or more of the devices, said one of the failure modes being effected by the control means if the one or more of the devices which has failed are required for the continued operation of the devices which have not failed.

26. The apparatus of claim 25 wherein said visual display includes means for identifying the particular one of said devices which has failed.

27. The apparatus of claim 25 wherein said indicator means further include a. temperature sensing means for sensing a temperature in a conditioned zone and for producing a signal responsive thereof;

b. setpoint means for setting comfort temperatures to be maintained in the conditioned zone during heating or cooling thereof and for producing signals responsive thereto;

c. switch means for selecting one of a plurality of different states in which the system will operate, and for producing a signal indicative of the state selected;

and d. multiplexor means for selecting one of said temperature sensing means, setpoint means, or switch means as a source of signal input to the control means in response to a command signal from the control means.

28. The method of claims 12, 16, or 20 further comprising the steps of a. de-energizing substantially all of the devices if the magnitude of the signal proportional to the supply current decreases from the immediately preceding monitored value independently of a controlled change in the controlled status of said devices; and b. thereafter attempting to selectively energize the devices; and c. identifying the one or more failed devices, by the magnitude of the signal proportional to the supply current not increasing when said step of attempting to selectively energize the devices is carried out.

29. The method of claim 28 further comprising the step of locking-out of operation one or more of the devices, following the step of identifying the one or more failed devices.

30. The method of claim 29 wherein said steps of effecting an indication of failure of one or more devices and locking out one or more devices from operating include the step of locking-out of operation substantially all the devices and effecting an indication of a total failure, if the devices which have failed are required for the continued operation of the devices which have not failed.

31. The method of claims 13, 14, 15, 16, 17, or 20 further comprising the step of delaying a response to the magnitude of the signal proportional to the supply current for a predetermined time after said controlled change in the controlled status has occurred, to allow time for settling.

* * * * *